United States Patent [19]

Onga et al.

[11] Patent Number: 5,436,658
[45] Date of Patent: Jul. 25, 1995

[54] CAMERA APPARATUS FOR FORMING A PLURALITY OF DIFFERENT KINDS OF PICTURES CORRESPONDING TO DIFFERENT TELEVISION STANDARDS AND DIFFERENT ASPECT RATIOS

[75] Inventors: Makoto Onga; Tsutomu Niimura, both of Kanagawa, Japan

[73] Assignee: Sony Corporation, Tokyo, Japan

[21] Appl. No.: 291,494

[22] Filed: Aug. 17, 1994

Related U.S. Application Data

[63] Continuation of Ser. No. 978,366, Nov. 18, 1992, abandoned.

[30] Foreign Application Priority Data

Nov. 20, 1991 [JP] Japan ................. 3-332433

[51] Int. Cl.[6] ............................. H04N 5/225
[52] U.S. Cl. ..................... 348/239; 348/207
[58] Field of Search ............... 348/208, 222, 272, 313, 348/441, 443, 230, 218, 239, 207; H04N 3/15, 3/14, 5/225

[56] References Cited

U.S. PATENT DOCUMENTS

| 4,426,664 | 1/1984 | Nagumo et al. | 358/213.26 |
| 4,496,974 | 1/1985 | Heitmann | 348/458 |
| 4,706,122 | 11/1987 | Akiyama | 348/340 |
| 5,184,216 | 2/1993 | Kobayashi | 348/208 |
| 5,218,442 | 6/1993 | Hamada et al. | 358/225 |
| 5,231,491 | 7/1993 | Holoch | 358/140 |
| 5,253,071 | 10/1993 | MacKay | 348/208 |

FOREIGN PATENT DOCUMENTS

| 0391755 | 10/1990 | European Pat. Off. | H04N 3/14 |
| 0449210 | 10/1991 | European Pat. Off. | H04N 3/15 |
| 2116397 | 9/1983 | United Kingdom | 358/222 |

Primary Examiner—Joseph Mancuso
Assistant Examiner—Tuan V. Ho
Attorney, Agent, or Firm—Hill, Steadman & Simpson

[57] ABSTRACT

In a camera device, the pixel numbers of an imaging device are selected to be greater than the largest number of pixels necessary for the generation of video signals of different aspect ratios and television standards. Output signals of the imaging device are stored in a memory and are then are selectively output. As a result, common use of an imaging device is permitted for camera apparatuses of, for instance, the NTSC, PAL and other standards.

4 Claims, 14 Drawing Sheets

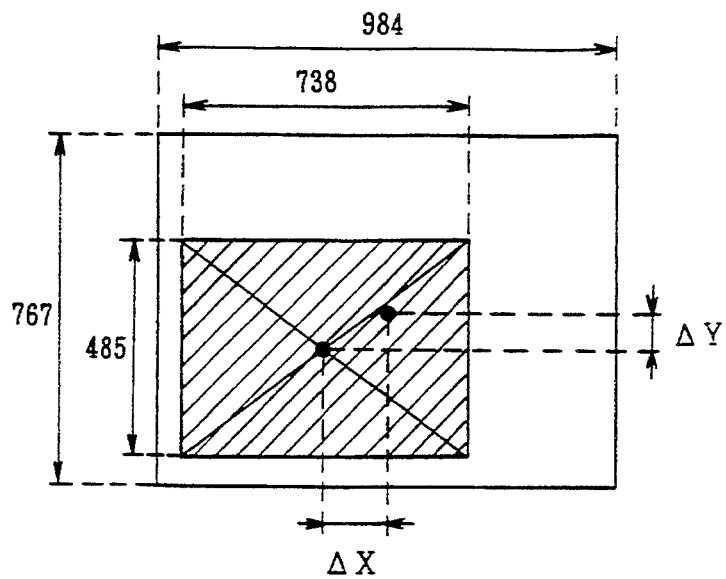
FIG. 9
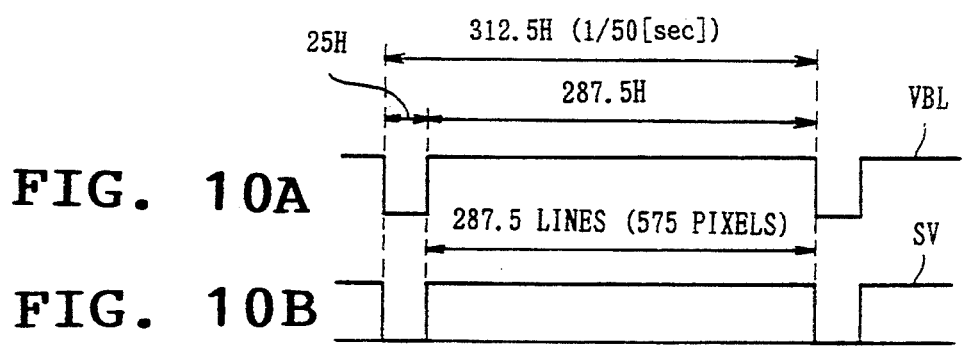
FIG. 10A
FIG. 10B
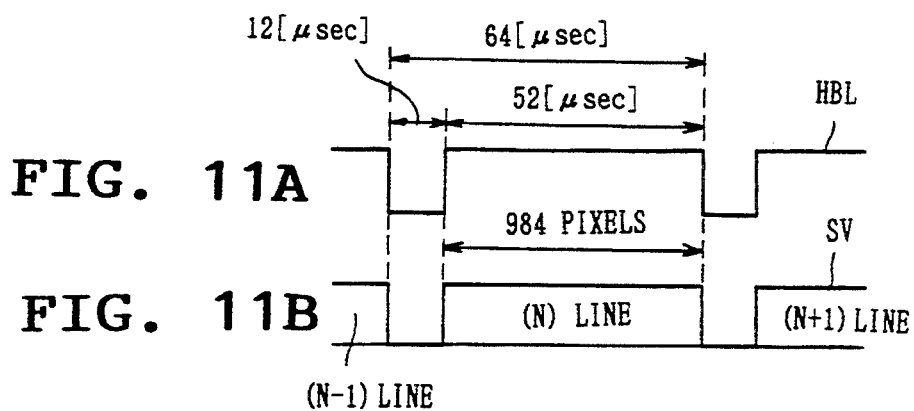
FIG. 11A
FIG. 11B

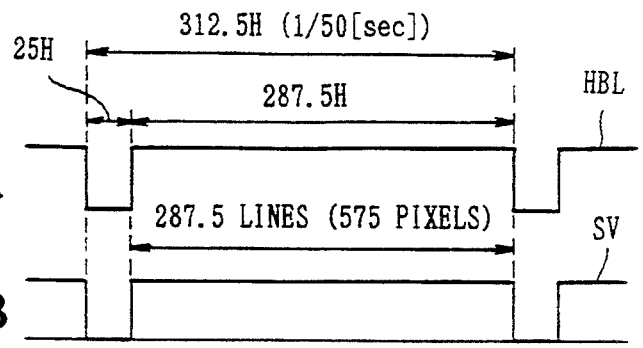
FIG. 12A
FIG. 12B
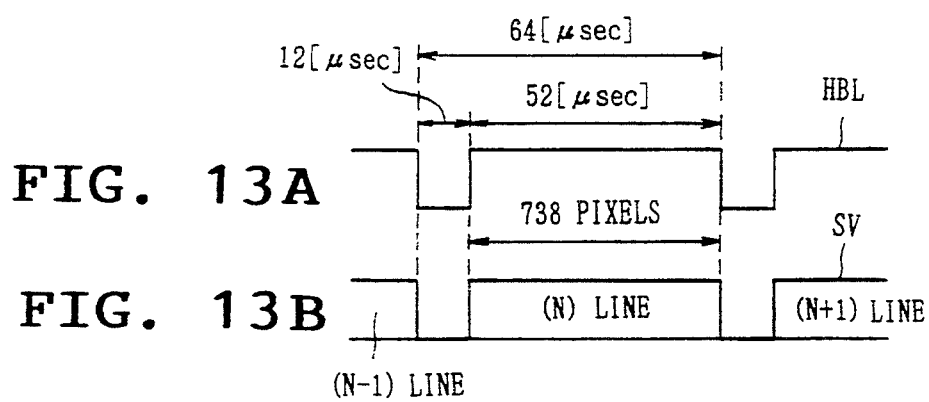
FIG. 13A
FIG. 13B
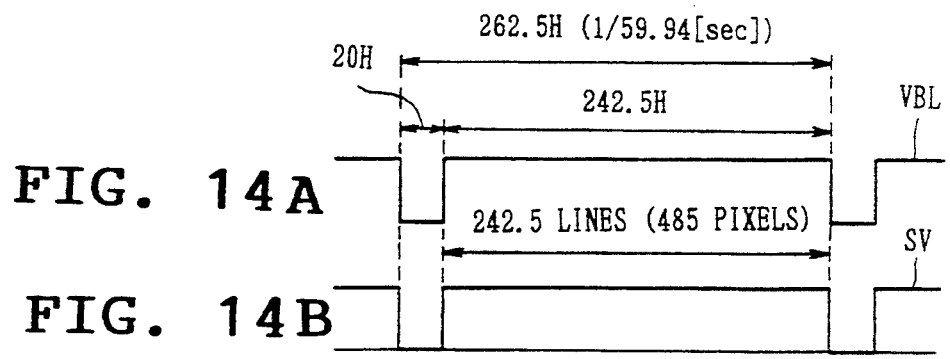
FIG. 14A
FIG. 14B

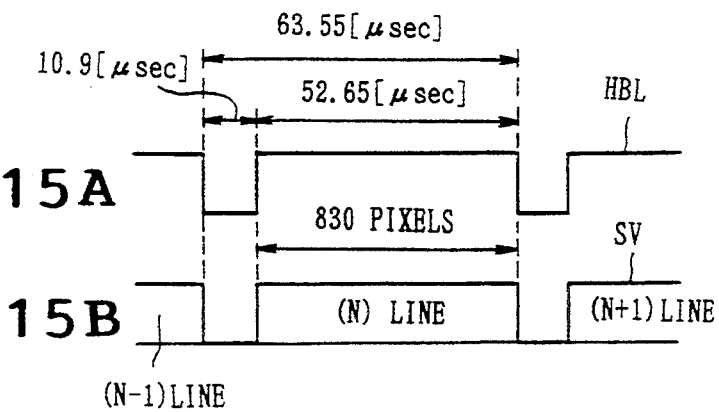
FIG. 15A
FIG. 15B
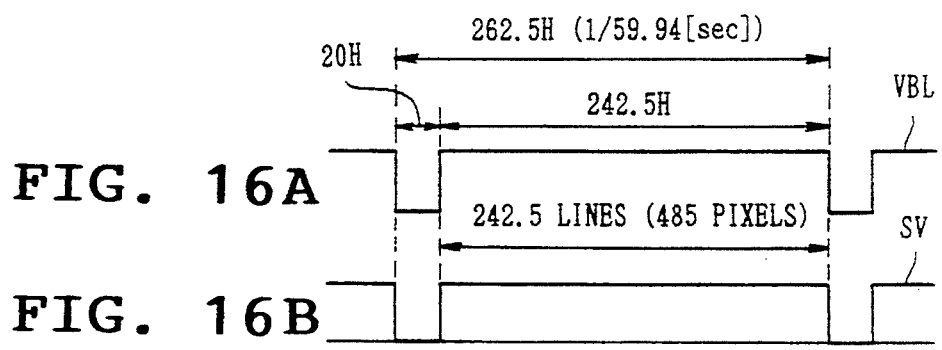
FIG. 16A
FIG. 16B
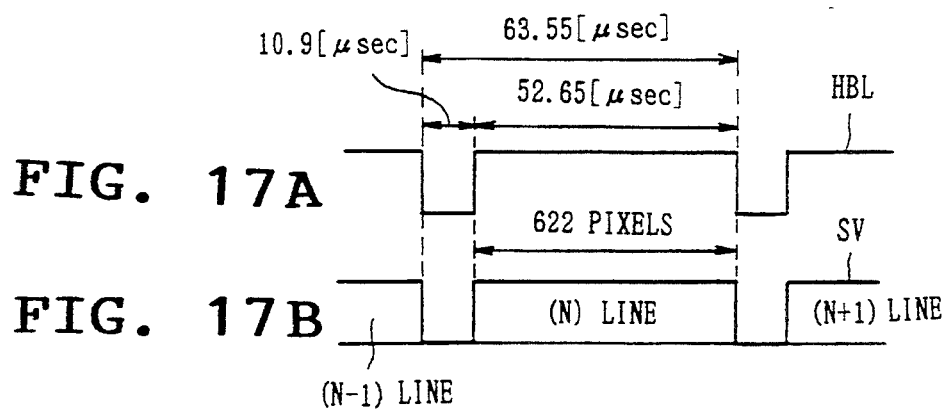
FIG. 17A
FIG. 17B

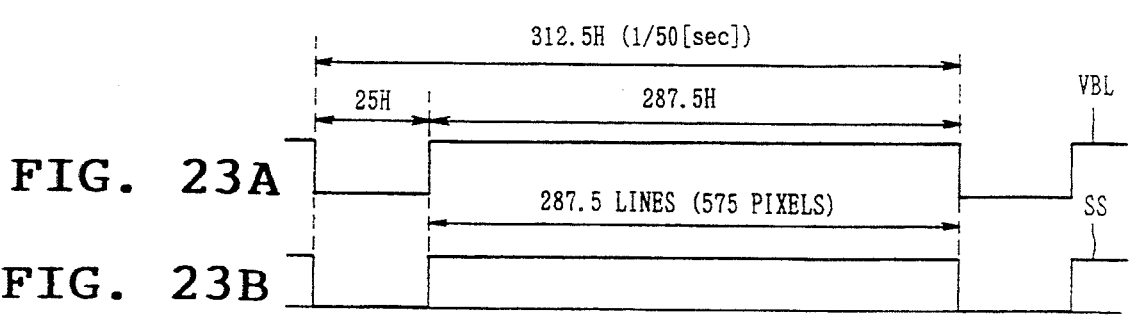
FIG. 23A
FIG. 23B
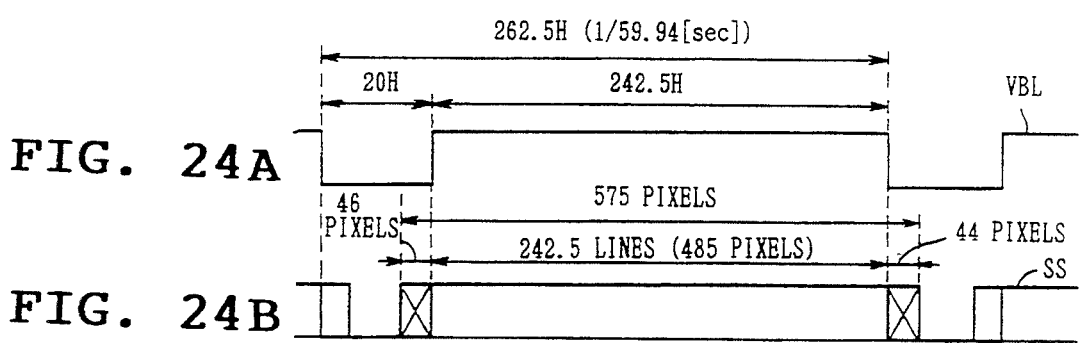
FIG. 24A
FIG. 24B

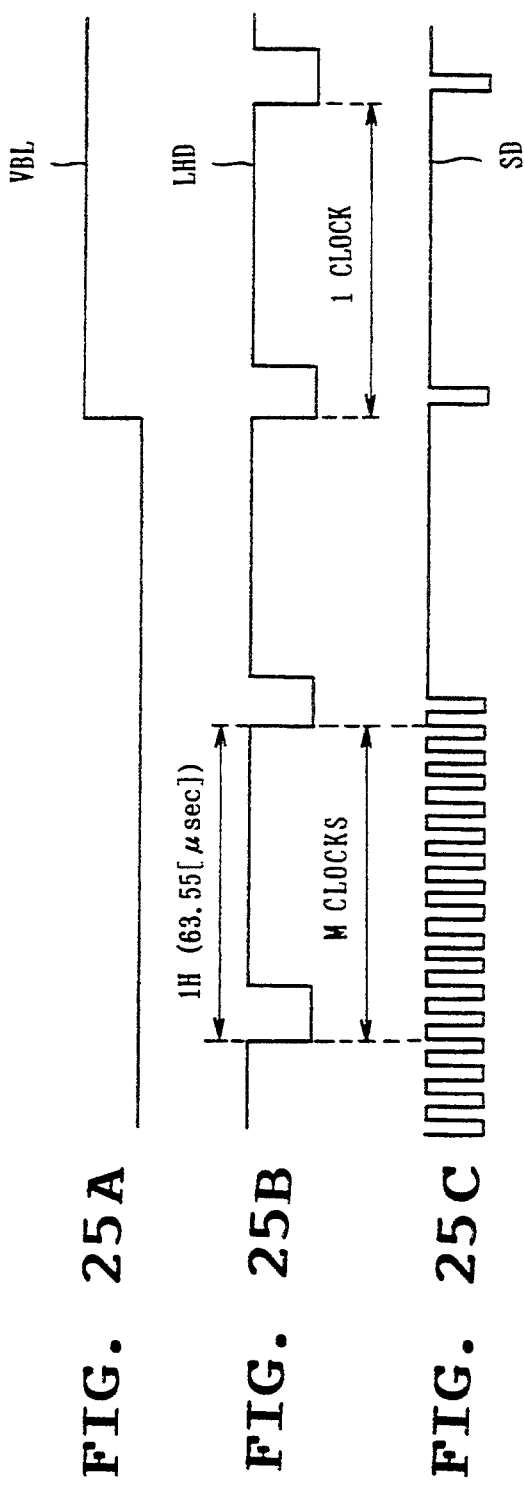

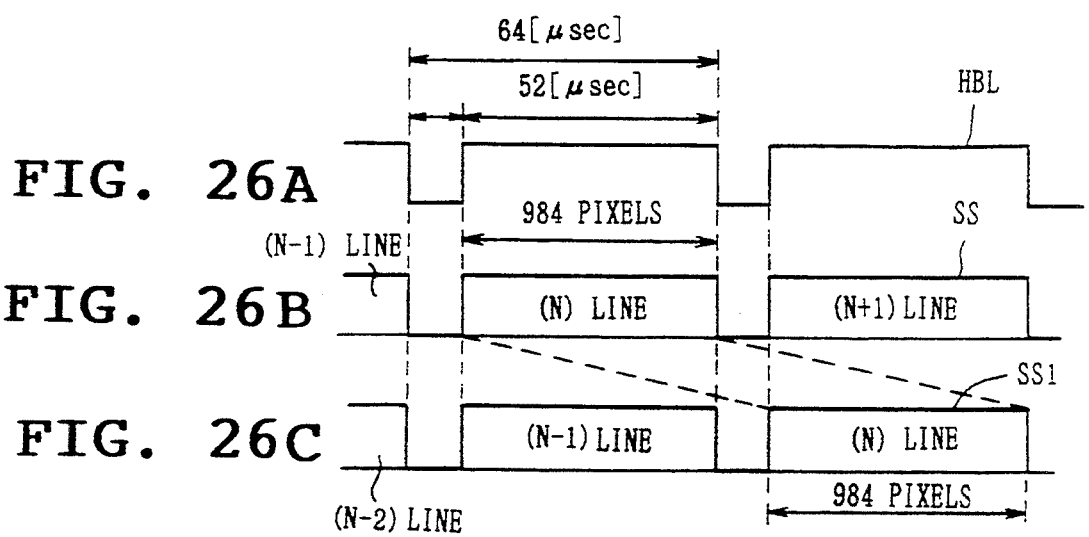
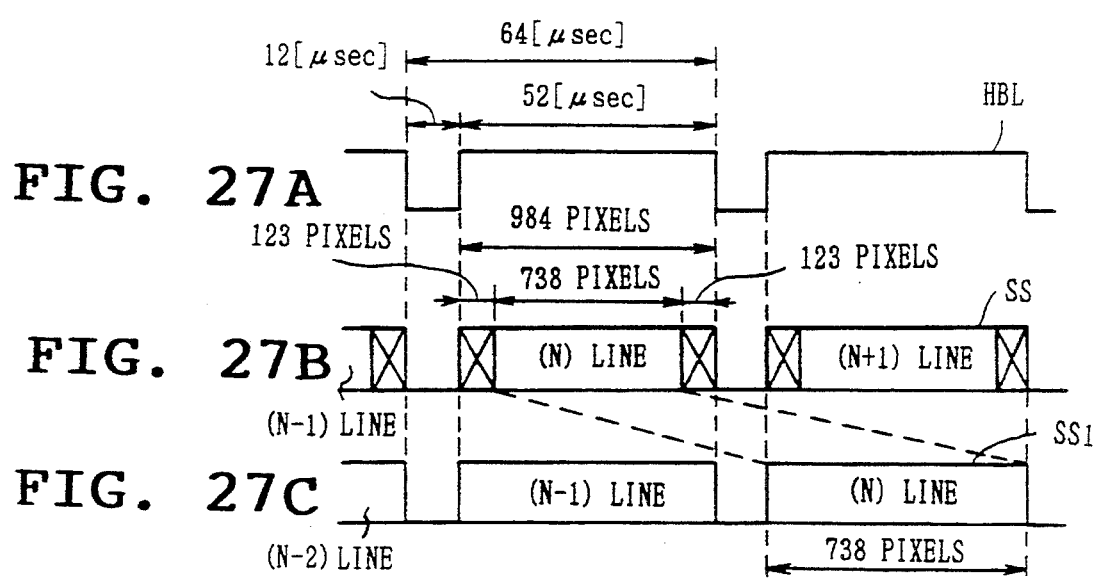

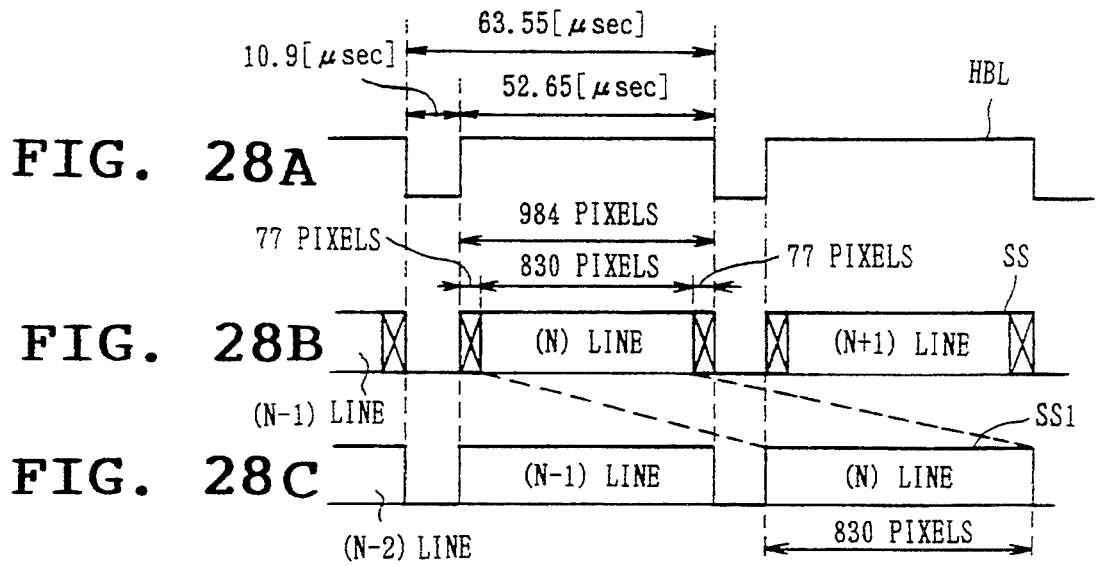
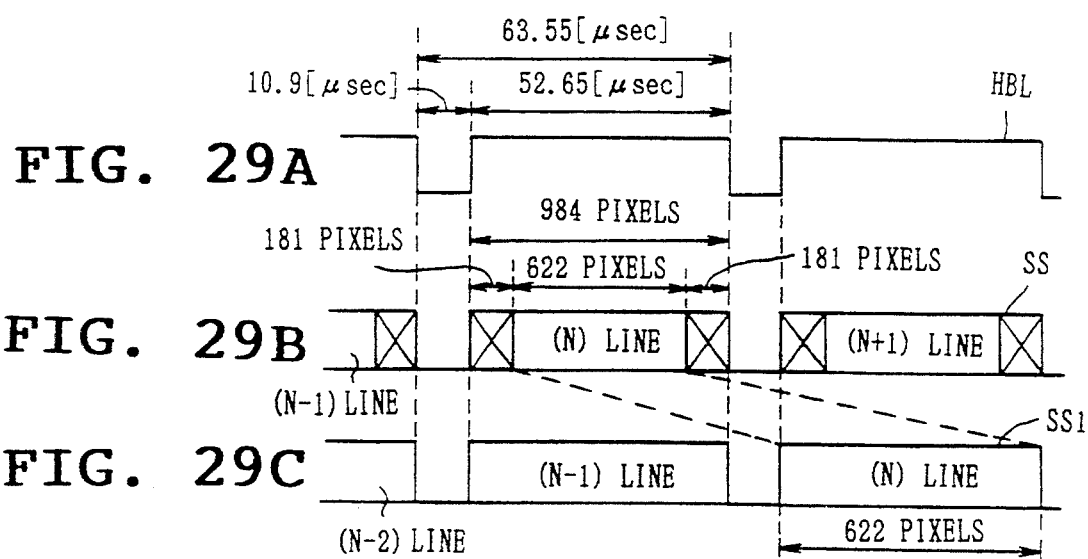

CAMERA APPARATUS FOR FORMING A PLURALITY OF DIFFERENT KINDS OF PICTURES CORRESPONDING TO DIFFERENT TELEVISION STANDARDS AND DIFFERENT ASPECT RATIOS

This is a continuation of application Ser. No. 07/978,366, filed Nov. 18, 1992 now abandoned.

BACKGROUND OF THE INVENTION

1. Field of the Invention

This invention relates to a camera apparatus, and more particularly is applicable to a television camera of the NTSC standard and PAL standard etc., for example.

2. Description of the Prior Art

The prior art camera apparatus of this type uses imaging devices conforming to the pertinent television system for generating video signals.

In a camera apparatus of the PAL standard (hereinafter referred to as normal PAL standard) in which the aspect ratio is 4:3, a signal is read out repeatedly in a cycle period of 1/50 sec. from an imaging device which has 738 (horizontal) by 575 (vertical) effective pixels, as shown in FIG. 1.

Thus, in the PAL standard camera apparatus the image signal is converted to a PAL standard video signal by processing it in a predetermined signal processor.

On the other hand, in a camera apparatus of the NTSC standard (hereinafter referred to as the normal NTSC standard), in which the aspect ratio is again 4:3, a signal is read out repeatedly in a cycle period of 1/59.94 sec. from an imaging device, which has 622 (horizontal) by 485 (vertical) effective pixels.

The television standards of this type further include, in addition to the normal standard with the aspect ratio of 4:3, those with an aspect ratio of 16:9 (hereinafter referred to as wide standards).

In this case, the camera apparatus has to use an imaging device having the horizontal and vertical pixel numbers corresponding to the aspect ratio noted above.

Further, a camera apparatus which effects camera shake compensation by taking out a predetermined area of a picked-up image according to motion detection results, has to use an imaging device having more effective pixel numbers in correspondence to the camera shake compensation.

In general, the prior art camera apparatuses have to use exclusive imaging devices depending on the television standards, aspect ratio and the presence or absence of the camera shake compensation.

SUMMARY OF THE INVENTION

In view of the foregoing, an object of this invention is to provide a camera apparatus, which permits use of a common imaging device regardless of the pertinent television normal standard, aspect ratio etc.

The foregoing object and other objects of the invention have been achieved by the provision of a camera apparatus as shown in FIGS. 2 and 3 having an imaging device 4 for outputting image signals SS of a picked-up image formed on an imaging surface, a memory 8 for storing and outputting the image signals SS, and a signal processor 24 and 26 for converting the image signals SS output from the memory 8 to a predetermined video output signal SV. The imaging device 4 has a number of effective pixels which are: 1) greater than the largest number of pixels necessary for the generation of a video output signal SV; 2) greater than the largest number of pixels necessary for the generation of a video signal which is of the same television standard as, and has a first aspect ratio different from, that of the video output signal SV; greater than the largest numbers of pixels necessary for the generation of a video signal which is of a first television system different from, and has the same aspect ratio as that of the video output signal SV; and 4) greater than the largest number of pixels necessary for the generation of a video signal which is of the first television standard and has the first aspect ratio. The memory 8 stores the image signals SS output from the imaging device 4 for the effective pixels thereof and selectively outputs the stored image signals SS in correspondence to the television standards and aspect ratio of the video output signal SV.

Using the imaging device 4, which has effective pixel numbers greater than the largest number of pixels necessary for the generation of video signals of a plurality of different aspect ratios and also a plurality of different television standards, the image signals SS from the imaging device 4 are stored in a memory and selectively output according to the television standard and aspect ratio of the video output signal SV. Thus, the imaging device 4 may also be used for camera apparatuses which output video signals of different aspect ratios and different television standards.

According to the invention it is possible to obtain a camera apparatus comprising an imaging device having effective pixel numbers greater than those which are greatest among those necessary for the generation of video signals of different aspect ratios and television standards. The imaging device is thus capable of being used commonly for different aspect ratios and television standards by switching its operation, and by storing and selectively outputting its output signals in and out of a memory.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 9 is a schematic diagram for explaining camera shake compensation for the same;

FIGS. 10A and 10B are time charts for explaining a processing of a video signal with respect to the vertical direction for the wide PAL standard;

FIGS. 11A and 11B are time charts for explaining a processing of a video signal with respect to the horizontal direction for the same;

FIGS. 12A and 12B are time charts for explaining a processing of a video signal with respect to the vertical direction for the normal PAL standard;

FIGS. 13A and 13B are time charts for explaining a processing of a video signal with respect to the horizontal direction for the same;

FIGS. 14A and 14B are time charts for explaining a processing of a video signal with respect to the vertical direction for the wide NTSC standard;

FIGS. 15A and 15B are time charts for explaining a processing of a video signal with respect to the horizontal direction for the same;

FIGS. 16A and 16B are time charts for explaining a processing of a video signal with respect to the vertical direction for the normal NTSC standard;

FIGS. 17A and 17B are time charts for explaining a processing of a video signal with respect to the horizontal direction for the same;

FIGS. 23A and 23B are time charts for explaining a processing for the standard and wide PAL standards;

FIGS. 24A and 24B are time charts for explaining a processing for the wide and normal NTSC standards;

FIGS. 25A to 25C are time charts for explaining the driving of the imaging device;

FIGS. 26A to 26C are time charts for explaining a processing of a video signal with respect to the horizontal direction for the wide PAL standard;

FIGS. 27A to 27B are time charts for explaining a processing of a video signal with respect to the horizontal direction for the normal PAL standard;

FIGS. 28A to 28C are time charts for explaining a processing of a video signal with respect to the horizontal direction for the normal PAL standard; and FIGS. 29A to 29C are time charts for explaining a processing of a video signal with respect to the horizontal direction for the normal NTSC standard.

DETAILED DESCRIPTION OF THE INVENTION

Preferred embodiments of this invention will be described with reference to the accompanying drawings:
First Embodiment Referring to FIG. 2, designated generally at 1 is a television camera of the NTSC standard, which outputs either a normal standard or a wide standard video signal SV in response to an operator's selecting operation.

In this television camera 1, a picked-up image is formed on an imaging device 4 through a lens 2, and a correlated double sampling circuit 6 converts the output signal of the imaging device 4 into an image signal SS.

Figure 3:
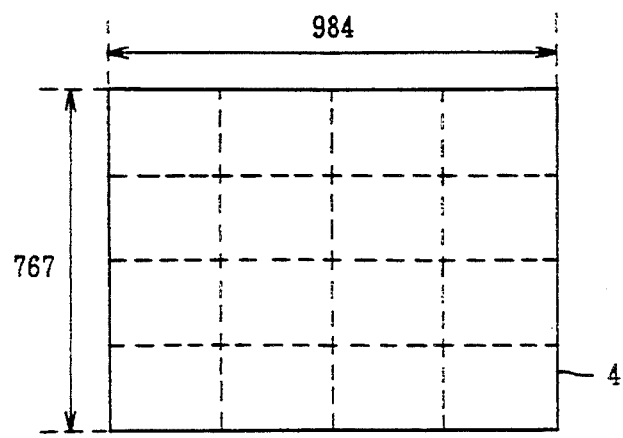
FIG. 3 is a plan view showing an imaging device of the same.

In the imaging device 4, the horizontal and vertical effective pixel numbers are set to 984 by 575, as shown in FIG. 3, which are 4/3 times the effective pixel numbers of 739 by 575 necessary for the normal PAL standard in order to meet the effective pixel numbers for the normal NTSC standard, the wide NTSC standard, wide PAL standard and normal PAL standard. The device thus is adapted to be capable of camera shake compensation, if necessary, and can be commonly used with the PAL standard television cameras as well.

Figure 4:
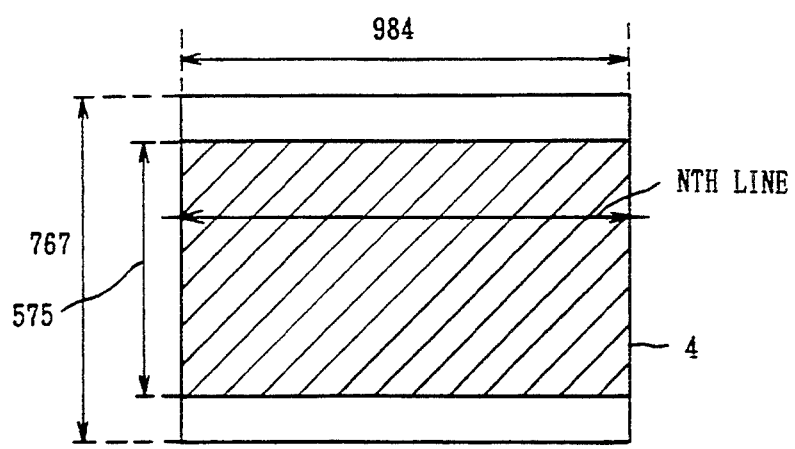
FIG. 4 is a schematic diagram for explaining a processing for the wide PAL standard.

More specifically, as shown in FIG. 4, by using 984 by 575 effective pixels among the 984 by 767 effective pixels for the video signal production, a wide PAL standard video signal can be obtained.

Figure 2:
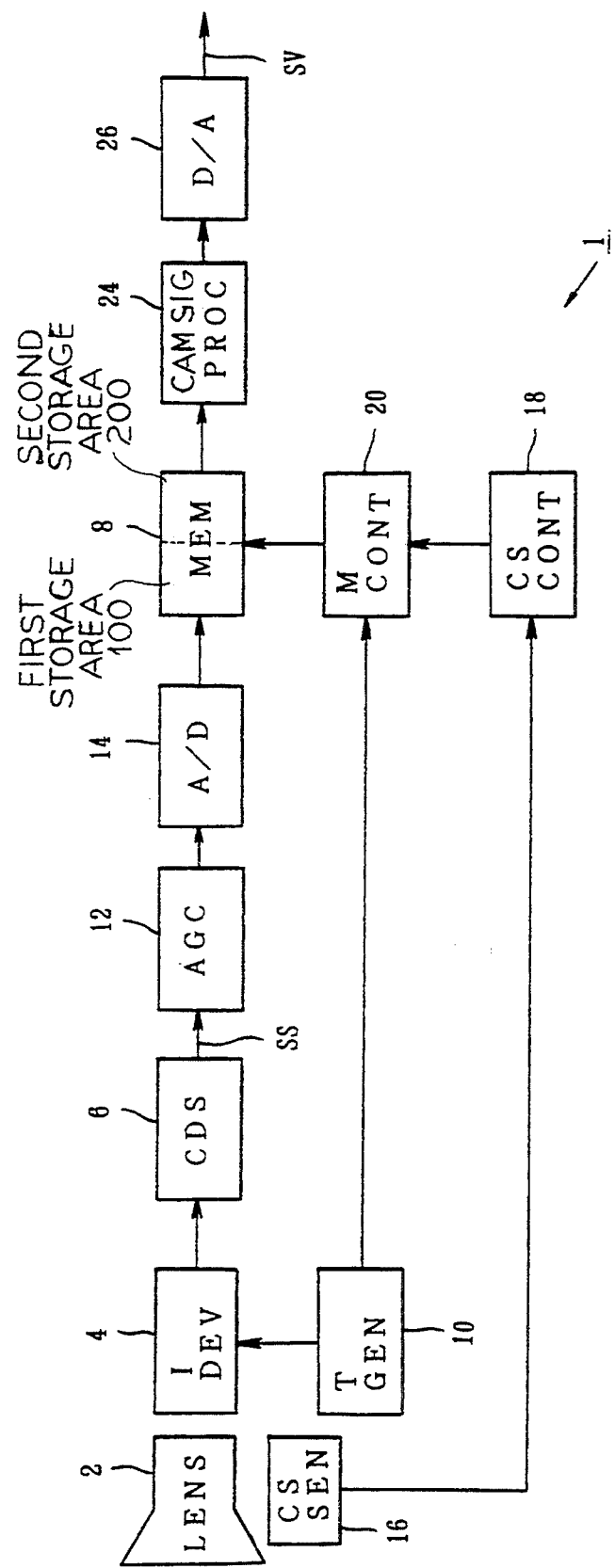
FIG. 2 is a block diagram showing an embodiment of the television camera according to this invention.
Figure 5:
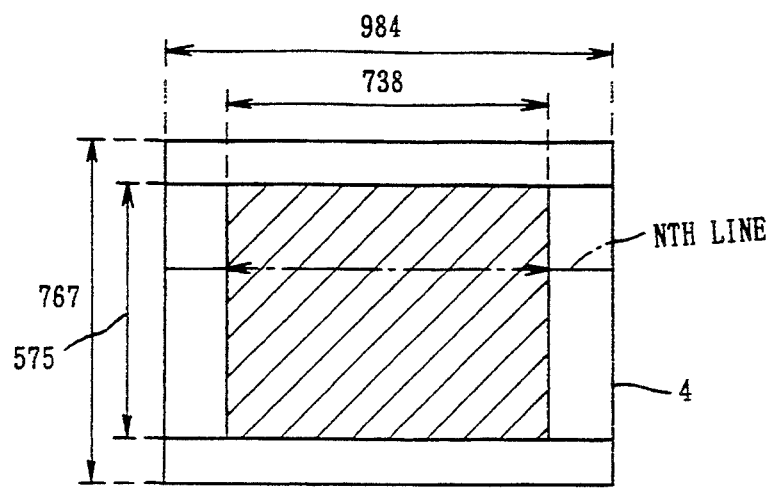
FIG. 5 is a schematic diagram for explaining a processing for for the normal PAL standard.
Figure 6:
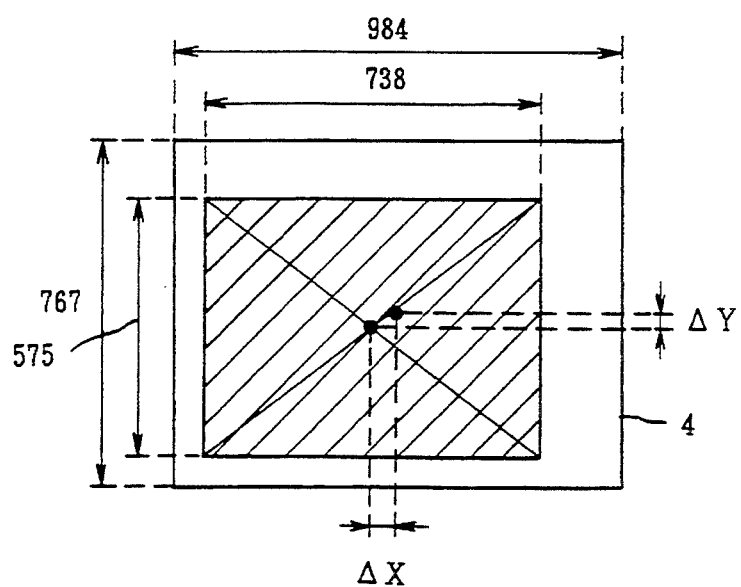
FIG. 6 is a schematic diagram for explaining camera shake compensation for the same.

For the normal PAL standard, as shown in FIG. 5, 738 by 575 effective pixels may be used for the video signal production. In this case, as shown in FIG. 6, camera shake compensation can be obtained by permitting the substitution or replacement of the positions of the effective pixels of the image according to the amount $\Delta x$, $\Delta y$ required to compensate for camera shake. As shown in FIG. 2, the memory 8, when the camera shake feature is provided, has a storage area 100 and a second storage area 200. The first storage area stores all image data obtained from all pixels of the imaging device and the second storage area is used for replacement of the image data necessary for compensating the camera shake. The above described substitution occurs by storing the new position values changed by the amount $\Delta x$, $\Delta y$ in the second storage area 200.

Figure 7:
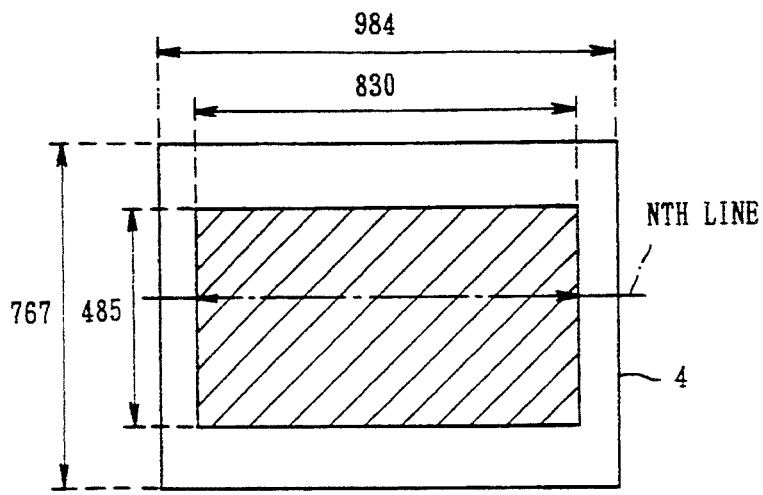
FIG. 7 is a schematic diagram for explaining a processing for the wide NTSC standard.
Figure 8:
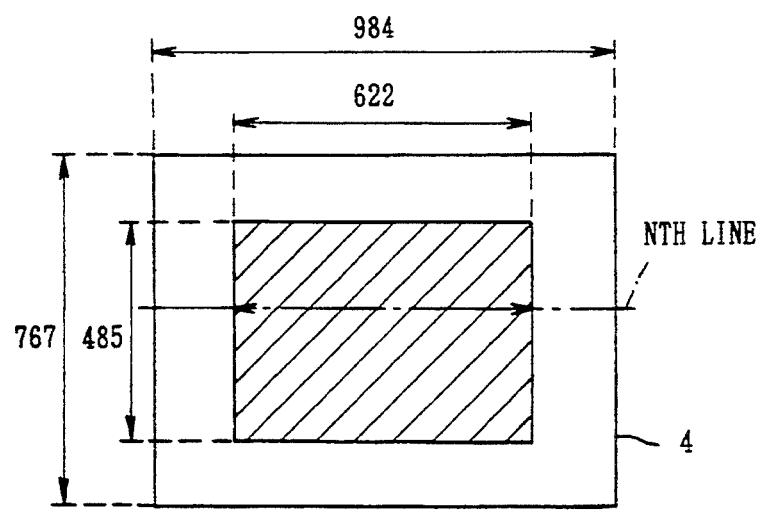
FIG. 8 is a schematic diagram for explaining a processing for the normal NTSC standard.

Likewise, as shown in FIGS. 7 to 9, for the video signal production 830 by 485 effective pixels may be used for the wide NTSC standard, and 622 by 485 effective pixels for the normal NTSC standard. Further, the camera shake compensation can be obtained by permitting the effective pixels position replacing.

Under these video signal production principles, as shown in FIG. 2 the television camera 1 stores the image signals SS of all the effective pixels of the imaging device 2 in a memory 8 and selectively outputs desired image signals SS. In this way, video signal SV of the normal NTSC standard or of the wide NTSC standard can be output.

In the television camera 1, a timing generator 10 outputs a predetermined drive signal to drive the imaging device 4.

Thus, in the television camera 1 image signals of all of the effective pixels of the imaging device 4 can be obtained at the field frequency of the NTSC standard through the correlated double sampling circuit 6.

The timing generator 10 is adapted to repeat the operation with a cycle period of 1/50 sec. in case of a PAL standard television camera, thus obtaining image signals at the field frequency of the PAL standard through the correlated double sampling circuit 6.

An automatic gain controller 12 effects compensation for the signal level of the image signals SS. An analog-to-digital converter 14 converts the image signal SS into a digital signal.

In this way, the television camera 1 can convert the image signal SS into a digital signal and outputs the video signal with a simple overall construction.

A camera shake sensor 16 comprises a horizontal and a vertical acceleration sensor, and outputs the results of detection by these acceleration sensors. A camera shake controller 18 detects a camera shake compensation amount according to the camera shake detection results and outputs the detected camera shake compensation amount data to a memory controller 20.

The memory controller 20 outputs consecutive write and read address data to the memory 8, whereby the image signals SS obtained from all the effective pixels of the imaging device 4 are stored in the memory 8 and are selectively output according to the video signal VS.

More specifically, in the wide PAL standard, as shown in FIGS. 10A and 10B, the necessary number of lines can be secured by permitting 312.5 lines of video signal to be output in a cycle period of 1/50 [sec], i.e., permitting 287.5 lines of image signal SS to be selectively output after the rising of the vertical blanking signal VBL (FIG. 10A). Thus, it is possible to secure the necessary number of lines for the wide PAL standard. In this case, the line repetition period is 64 [$\mu$sec], as shown in FIGS. 11A and 11B. Thus, for the horizontal line, the necessary effective pixel number for the wide PAL standard can be secured by permitting the image signals SS of 984 pixels (FIG. 10B) after the rising of the horizontal blanking signal HBL (FIG. 11A).

For the normal PAL standard, as shown in FIGS. 12A and 12B, and 13A and 13B, with respect to the horizontal direction, 287.5 of image signals SS (FIG. 12B) are selectively output after the rising of the vertical blanking signal HBL (FIG. 12A), and with respect to the horizontal direction, image signals SS of 738 pixels (FIG. 13B) are selectively output after the rising of the horizontal blanking signal HBL (FIG. 13A). In this way, it is possible to secure the necessary effective pixel number for the normal PAL standard.

In the wide NTSC standard, in which 262.5 lines of video signal are output in 1/59.94 [sec] as shown in FIGS. 14A and 14B, by permitting 242.5 lines of image signal SS (FIG. 14B) to be selectively output after the rising of the vertical blanking signal VBL (FIG. 14A), it is possible to secure the necessary line number for the wide NTSC standard.

With respect to the horizontal direction, which has a repetition period of 63.55 [$\mu$sec], by permitting image signals SS of 830 pixels (FIG. 15B) to be selectively output after the rising of the horizontal blanking signal HBL (FIG. 15A), it is possible to secure the necessary effective pixel number.

For the normal NTSC standard, as shown in FIGS. 16A and 16B, and 17A and 17B, by permitting 242.5 lines of image signals SS (FIG. 16B) to be selectively output after the rising of the vertical blanking signal VBL (FIG. 16A) and permitting image signals SS of 622 pixels (FIG. 17B) to be selectively output after the rising of the horizontal blanking signal HBL (FIG. 17A), it is possible to secure the necessary effective pixel number for this standard.

Further, it is possible to produce a camera shake compensated video signal with selective output of image signals by replacing areas according to a camera shake detection result.

Thus, in the television camera 1 of the pertinent NTSC standard, image signals necessary for the normal or wide NTSC standard are selectively output from the memory 8 in response to a user's selecting operation.

Further, when the user turns on a camera shake compensation operator, camera shake compensated image signals are output according to a detection result from the camera shake controller 18.

A camera signal processor 24 processes image signals output from the memory 8 and outputs a video signal which is thus obtained.

A digital-to-analog converter 26 converts the output signal from the camera signal processor 24 and outputs an analog video signal SV which is thus obtained. Thus, the television camera 1 can output a video signal SV of either a normal or a wide NTSC standard by using the imaging device 4, which can be used for the PAL standard as well.

With the above construction of the television camera 1, the imaging device 4 outputs image signals SS of 984 by 767 effective pixels in a cycle period of 1/59.94 [sec], the output image signals SS being stored in the memory 8.

As the output of image signals SS from the memory 8, for the wide NTSC standard, 262.5 lines of video signal are selectively output in 1/59.94 [sec], while for the normal NTSC standard, 242.5 lines of image signals SS are selectively output. With respect to the horizontal direction, image signals SS of 830 pixels are selectively output, as shown in FIGS. 15A and 15B.

Thus, in the television camera 1, image signals consisting of 830 by 485 and 622 by 485 effective pixels can be obtained, which are necessary for the wide and normal NTSC standards, and a video signal SV of the wide or normal NTSC system can be obtained with the processing of a pertinent image signal in the camera signal processor 24.

In this case, the television camera 1 can output a camera shake compensated video signal SV with selective output of image signals by switching areas according to a camera shake detection result.

Further, when desired, the imaging device 4 may be used for PAL standard television cameras to obtain the normal and wide PAL standard video signals through exclusive camera signal processors 24 by switching the operation of the memory 8.

In the above construction, for satisfying the effective pixel numbers necessary for the normal and wide NTSC and PAL standards, the effective pixel numbers of the imaging device are selected to be 4/3 times 739 by 575 effective pixels necessary for the normal PAL standard, that is, 984 by 767 effective pixels, and the image signals stored in the memory 8 are selectively output as necessary for the normal and wide NTSC standards. Thus, it is possible to output normal and wide NTSC standard video signals by using an imaging device which can be used for PAL system television cameras and let the imaging device be used commonly for the normal and wide PAL and NTSC standards.

Second Embodiment

Figure 18:
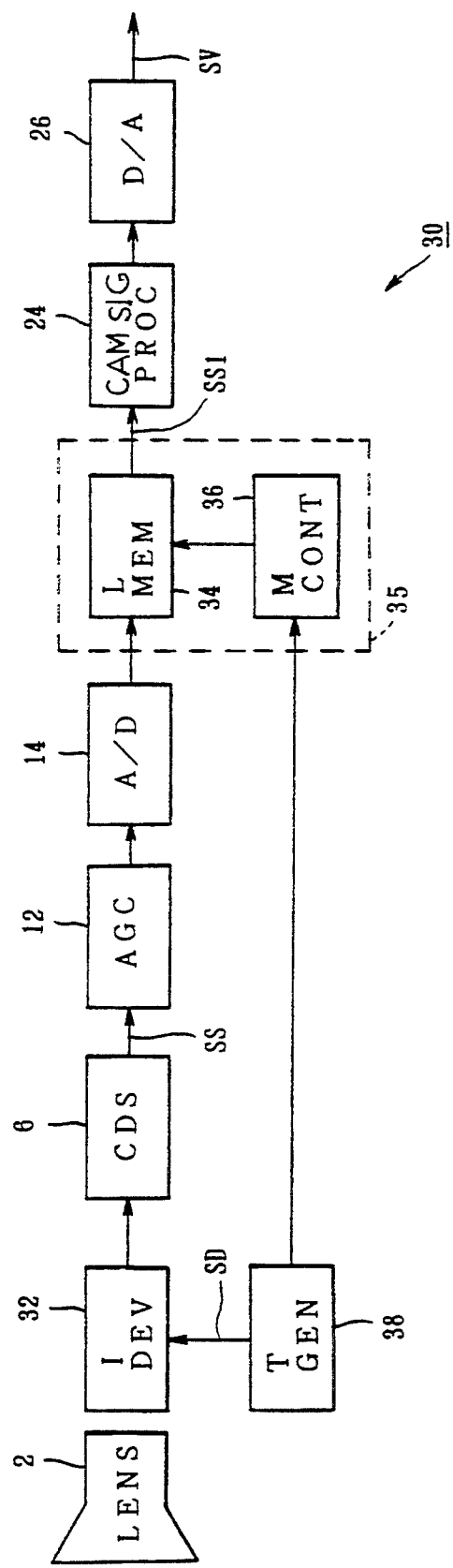
FIG. 18 is a block diagram showing a second embodiment of the television camera.

Referring to FIG. 18, designated generally at 30 is a second embodiment of the television camera, in which an imaging device 32 of the wide PAL standard is used to output video signals SV of the normal and wide NTSC standards.

Figure 19:
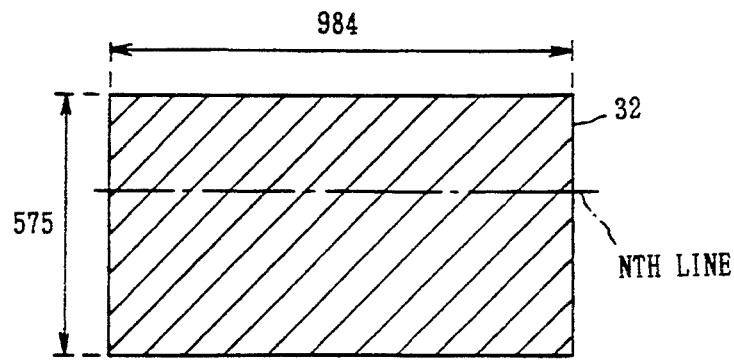
FIG. 19 is a plan view showing an imaging device for the same.

In this case, the imaging device 32 has the greatest necessary effective pixel numbers among those of the wide and normal PAL and NTSC standards, that is, those of the wide PAL standards, which are 984 by 575, as shown in FIG. 19. Thus, a wide PAL standard video signal can be output with processing of successive image signals from the imaging device 32.

Figure 20:
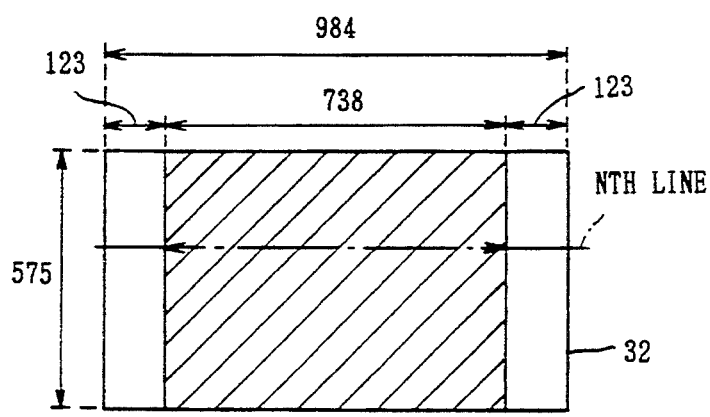
FIG. 20 is a schematic diagram for explaining a processing for the normal PAL standard.

On the other hand, when outputting the normal PAL standard video signal, the imaging device 32 can selectively process 738 pixels with respect to the horizontal direction as shown in FIG. 20, and thus it is possible to output the normal PAL standard video signal.

Figure 22:
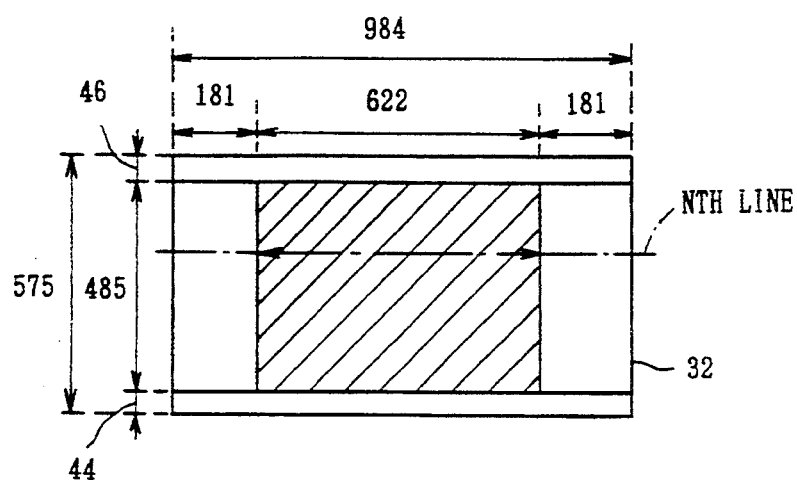
FIG. 22 is a schematic diagram for explaining a processing for the normal NTSC standard.
Figure 1:
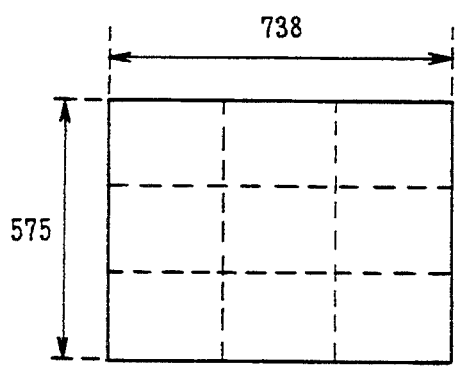
FIG. 1 is a schematic diagram showing a conventional imaging device for the normal PAL standard.
Figure 21:
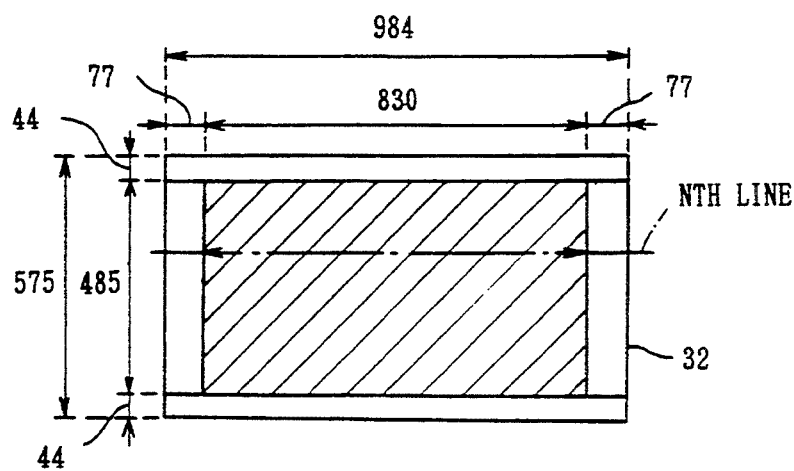
FIG. 21 is a schematic diagram for explaining a processing for the wide NTSC standard.

Further, for the wide and normal NTSC standards, 830 by 485 and 622 by 485 pixels are selectively processed, respectively, as shown in FIGS. 21 and 22, and thus it is possible to obtain the wide and normal NTSC standard video signals.

The television camera selectively outputs image signals using a line memory 34 of a time base expanding processor 35 with respect to the horizontal direction while it transfers at high speed the stored charge in a vertical register of the imaging device 32 with respect to the vertical direction, thus securing the necessary number of lines.

More specifically, when wide and normal PAL standard video signals are necessary, as shown in FIGS. 23A and 24B, the imaging device 32 outputs successive image signals in synchronism to the vertical blanking signal VBL (FIG. 23A), thus outputting the image signals of all the effective pixels of the imaging device 32.

On the other hand, for the wide and normal NTSC standards, as shown in FIGS. 24A and 24B, stored charge for 90 vertical pixels of the imaging device 32 (FIG. 24B) is transferred at high speed by utilizing the low level period of the vertical blanking signal VBL (FIG. 24A) (which constitutes the vertical blanking period).

In this case, as shown in FIGS. 25A to 25C, the television camera 30 switches the operation of the timing generator 38 according to a control signal output from a memory controller 36 to hold the charge transfer control signal SD (FIG. 25C) (usually falling in synchronism to the horizontal sync signal LHD (FIG. 25B) at the low level during the low level period of the vertical blanking signal VBL (FIG. 25A).

Thus, in the imaging device 32 the stored charge is transferred at high speed for the number of falling times of the control signal SD. In this embodiment, the transferred charge corresponds to 90 vertical pixels.

A line memory 34 successively stores the output signal of the analog-to-digital converter 14 according to address data output from the memory controller 36 and thereby stores image signals SS other than those in the area for which the high speed charge transfer has been effected. Thus, it selectively outputs only necessary signals with respect to the horizontal direction.

The line memory 34 is driven in this case such that the read period is longer than the write period, thus effecting time axis elongation of the image signals which are to be selectively output.

The line memory 34 thus converts image signals SS such that the image signals with respect to the horizontal direction correspond to the necessary pixel number, and outputs the selected image signals by assigning them to a video interval.

More specifically, for the wide PAL standard, as shown in FIGS. 26A to 26C, image signals SS (FIG. 26B) which have been input in synchronism to the horizontal blanking signal HBL (FIG. 26A) may be successively output at the same timings (FIG. 26C). For the normal PAL standard, as shown in FIGS. 27A to 27C, of the image signals SS (FIG. 27B) having been input in synchronism to the horizontal blanking signal HBL (FIG. 27A), those of the central 738 pixels may be selectively output in a period of 52 [$\mu$sec] (FIG. 27C), whereby a normal PAL standard video signal is obtained.

On the other hand, for the wide NTSC standard, as shown in ]FIGS. 28A to 28C, of image signals SS (FIG. 28B) input in synchronism to the horizontal blanking signal HBL (FIG. 28A), those of the central 830 pixels may be selectively output in a period of 52.65 [$\mu$sec] (FIG. 28C) to produce a wide NTSC standard video signal.

Likewise, for the normal NTSC standard, as shown in FIGS. 29A to 29C, of image signals SS (FIG. 29B) input in synchronism to the horizontal blanking signal HBL (FIG. 29A), those of the central 622 pixels may be selectively output in a period of 52.65 [$\mu$sec] (FIG. 29C) to produce a normal NTSC standard video signal.

It is to be appreciated that by using the common imaging device 32, video signals having desired television standards and aspect ratios may be produced by switching the conditions of driving of the device and executing a selective output process and a time axis elongation process using the line memory 34.

Thus, in the television camera 30, the line memory 34 generates image signals SS1 necessary for the generation of the wide and normal NTSC standards in response to a user's operation, and then outputs such image signals to a camera signal processor 24.

With the construction of FIG. 18, using the imaging device of the wide PAL standard, which has the greatest necessary effective pixel numbers among those of the wide and normal PAL and NTSC standards, video signals adapted for desired television systems and aspect ratios can be generated by switching the conditions of driving of the imaging device and permitting the image signals stored in the line memory 34 to be selectively output. It is thus possible to output video signals of the normal and wide NTSC standards by using the imaging device of the wide PAL standard.

Other Embodiments

In the previous first embodiment, the effective pixel numbers of the imaging device were selected to 4/3 of those of the wide PAL standard. However, this is by no means limiting, and according to the invention it is possible to select various effective pixel numbers as desired.

The first embodiment is concerned with a case in which acceleration sensors are used for the camera shake detection. However, this invention is not limited to this, but also it is applicable to make use of a motion vector detection method for the camera shake detection, for example.

The second embodiment is concerned with a case, in which the line memory 8 selectively outputs necessary image signals and effects time axis elongation. This invention is not limited to this, however, but also it is applicable to let the imaging device execute a time axis elongation process by effecting high speed charge transfer with respect to the horizontal direction as well, for example.

In the above embodiments the imaging device has been for common use for the normal and wide PAL and NTSC standards. This invention is not limited to this, however, but also it is applicable to a case in which the imaging device is for common use for various other television standards such as SECAM standards as well and for various aspect ratios.

While the preferred embodiments of the invention have been described, it will be obvious to those skilled in the art that various changes and modifications may be made therein without departing from the invention, and it is desired, therefore, to cover in the appended claims all such changes and modifications as fall within the true spirit and scope of the invention.

What is claimed is:
1. A camera apparatus, comprising:

an imaging device for transforming pixel images of a picked-up picture formed on an imaging plane into image data;

said imaging device having a number of pixels in both horizontal and vertical directions which is greater than a largest number of pixels necessary in said horizontal and vertical directions for forming a plurality of different kinds of pictures corresponding to different television standards and different aspect ratios to be displayed;

a single memory for storing said image data of said pixel images so as to represent an arrangement of said pixel images of said picked-up picture on said imaging plane;

a memory controller for reading out said image data stored in said memory;

a timing generator for driving said imaging device and also providing outputs to said memory controller;

a signal processor for transforming said image data read out from said memory into a video output signal; and said memory controller providing write address data to said single memory for storing image signals from all pixels of the imaging device in the memory and for providing read address data to said same single memory for selectively outputting only a selected number of vertical and horizontal pixels corresponding to the desired television standard and aspect ratio for said video output signal where said desired television standard can have a lesser number of pixels in both the horizontal and vertical directions than said largest number.

2. A camera apparatus, comprising:

an imaging device for transforming pixel images of a picked-up picture formed on an imaging plane into image data;

said imaging device having a number of pixels in both horizontal and vertical directions which is greater than a largest number of pixels necessary in said horizontal and vertical directions for forming a plurality of different kinds of pictures corresponding to different television standards and different aspect ratios to be displayed;

a memory for storing said image data of said pixel images so as to represent an arrangement of said pixel images of said picked-up picture on said image plane, said memory comprising a first storage area for storing all of said image data obtained from all pixels of said imaging device and a second storage area for storing replacement image data corresponding to pixels having substituted positions for replacement of said image data in order to compensate for a camera shake;

a signal processor for transforming said image data and replacement image data read out from said memory into a video output signal; and said memory controller providing write address data to said memory for storing said image data and said replacement image data for all pixels of the imaging device in the memory and for providing read address data to said memory for selectively outputting only a selected number of vertical and horizontal pixels corresponding to the desired television standard and aspect ratio for said video output signal and where said desired television standard can have a lesser number of pixels in both the horizontal and vertical directions than said largest number.

3. A camera apparatus according to claim 1 wherein said memory controller designates ranges of said image data in vertical and horizontal directions comprising a picture plane to be read out from said memory based on information externally input for a selected television standard and aspect ratio of the picture plane to be displayed.

4. A camera apparatus, comprising:

an imaging device for transforming pixel images of a picked-up picture formed on an imaging plane into image data;

said imaging device having a number of pixels in both horizontal and vertical directions which is greater than a largest number of pixels necessary in said horizontal and vertical directions for forming a plurality of different kinds of pictures corresponding to different television standards and different aspect ratios to be displayed;

a time base expanding processor having a single line memory and a memory controller connected to the line memory;

a timing generator connected to said memory controller and connected for controlling said imaging device;

a signal processor for transforming said image data read out from said line memory into a video output signal; and said memory controller via said timing generator switching conditions for driving said imaging device and for executing a selective output process and a time axis elongation process by changing a read period relative to a write period of said single line memory for outputting only a selected number of pixels in the horizontal and vertical directions of a picture to be displayed corresponding to a desired television standard and aspect ratio for said video output signal where said desired television standard can have a lesser number of pixels in both the horizontal and vertical directions than said largest number.

* * * * *